US009529583B2

(12) United States Patent
Bradley et al.

(10) Patent No.: US 9,529,583 B2
(45) Date of Patent: Dec. 27, 2016

(54) SINGLE MICROCONTROLLER BASED MANAGEMENT OF MULTIPLE COMPUTE NODES

(71) Applicant: INTEL CORPORATION, Santa Clara, CA (US)

(72) Inventors: Christopher Neil Bradley, Tigard, OR (US); Terrence Trausch, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 14/142,687

(22) Filed: Dec. 27, 2013

(65) Prior Publication Data

US 2014/0201301 A1 Jul. 17, 2014

Related U.S. Application Data

(60) Provisional application No. 61/752,974, filed on Jan. 15, 2013.

(51) Int. Cl.
*H04L 29/08* (2006.01)
*G06F 9/445* (2006.01)
(52) U.S. Cl.
CPC .................... *G06F 8/665* (2013.01)
(58) Field of Classification Search
CPC .. G06F 8/665; G06F 11/2038; G06F 11/3006; G06F 11/2025; G06F 2201/84; G06F 1/26
See application file for complete search history.

(56) References Cited

U.S. PATENT DOCUMENTS

| 2006/0031447 | A1* | 2/2006 | Holt | H04L 12/24 709/223 |
| 2011/0010566 | A1 | 1/2011 | Bandholz et al. | |
| 2012/0023210 | A1 | 1/2012 | Lai et al. | |
| 2013/0151841 | A1* | 6/2013 | McGraw | G06F 11/3006 713/100 |

FOREIGN PATENT DOCUMENTS

| TW | 200532473 A | 10/2005 |
| TW | 201035871 A | 10/2005 |
| WO | 2012/050590 A1 | 4/2012 |
| WO | 2014/113266 A1 | 7/2014 |

OTHER PUBLICATIONS

Office Action for R.O. C. (Taiwanese) Patent Application No. 103100974, mailed Mar. 18, 2015, 10 pages.
International Search Report and Written Opinion received for PCT Patent Application No. PCT/US2014/010879, mailed on Feb. 28, 2014, 10 Pages.

* cited by examiner

*Primary Examiner* — Kim T Nguyen
(74) *Attorney, Agent, or Firm* — International IP Law Group, P.L.L.C.

(57) ABSTRACT

An apparatus for compute module management is described herein. The apparatus includes a host system and a logic solution. The host system includes a central processing unit and a plurality of sensors that collect system management data from multiple interfaces. The logic solution consolidates the system management data to a single format for a single interface and transmits the system management data to a central authority. The central authority includes system management firmware for managing each compute module using the consolidated system management data.

11 Claims, 3 Drawing Sheets

SINGLE MICROCONTROLLER BASED MANAGEMENT OF MULTIPLE COMPUTE NODES

PRIORITY CLAIM

This application claims priority to U.S. Provisional Application 61/752,974, filed on Jan. 15, 2013.

TECHNICAL FIELD

This disclosure relates generally to management of compute nodes. More specifically, the disclosure relates generally to management of multiple compute nodes with a single microcontroller.

BACKGROUND ART

Remote management of high density computing data centers is becoming increasingly popular, and so, cost of management on a per-node basis is increasing with it as well. A computing data center may include one or more systems, and each system can include a plurality of nodes. Each node may include a baseboard management controller (BMC). A BMC is used to manage each node, and may include management hardware and software for each node. System management information, such as power, temperature, operating system status, and the like may be collected by the BMC.

BRIEF DESCRIPTION OF THE DRAWINGS

The following detailed description may be better understood by referencing the accompanying drawings, which contain specific examples of numerous objects and features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
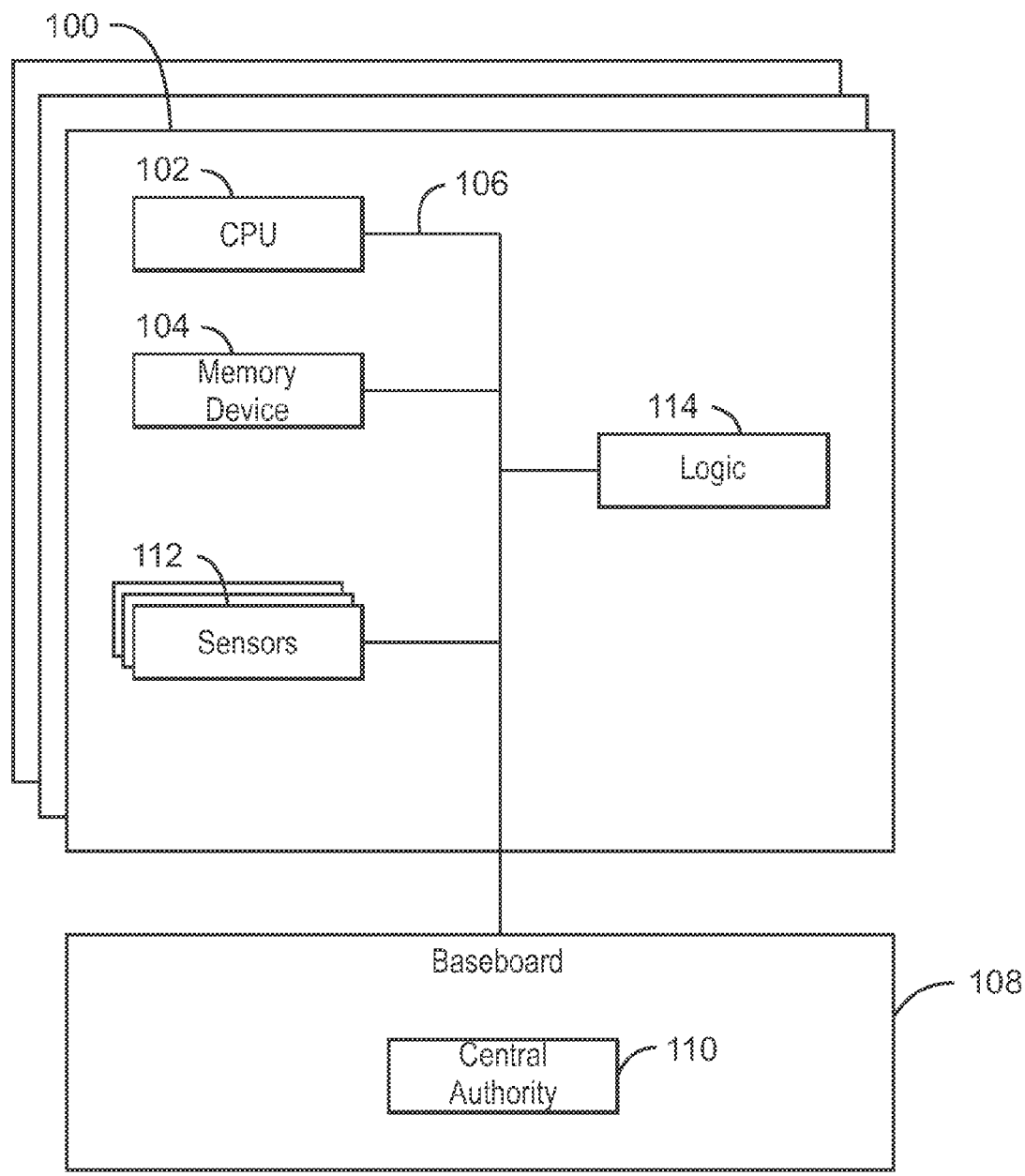
FIG. 1 is a block diagram of a compute module that may be coupled with a single microcontroller for management of multiple compute modules.

Remote management of high density computing data centers is becoming increasingly popular, and so, cost of management on a per-node basis is increasing with it as well. In order to enable remote management of compute nodes, the BMC associated with each node may collect system management information and pass this data to a management host. Each BMC includes management firmware. As a result, the management firmware for each node is maintained individually, and any management firmware update is applied to a plurality of nodes. Additionally, the interface between the compute node and the BMC may change frequently, depending on the compute node technologies used.

Embodiments described herein relate to single microcontroller based management of multiple compute nodes. An apparatus for compute module management is described herein. The apparatus includes a host system and a logic solution. The host system includes a central processing unit and a plurality of sensors that collect system management data from multiple interfaces. The logic solution consolidates the system management data to a single format for a single interface and transmits the system management data to a central authority. The central authority includes system management firmware for managing each compute module using the consolidated system management data. In this manner, the host system does not include a BMC or system management firmware. Instead, the BMC and system management firmware are centrally located, and updates may be applied to the BMC and system management firmware without any downtime for compute modules or nodes.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a compute module 100 that may be coupled with a single microcontroller for management of multiple compute modules. The compute module 100 may be, for example, a laptop computer, desktop computer, tablet computer, mobile device, server, or blade server, among others. In some examples, a compute module or compute node is any device that is capable of communicating across the multi-node system to another module. Accordingly, in some examples, the multi-node system is a network of modules, where each module is any device capable of communicating across the network. Additionally, in some examples, the multi-node is a server in a rack server system. The compute module 100 does not include a BMC. Rather, a single central authority is coupled to a plurality of nodes and contains management firmware for the plurality of nodes in a data center or server farm.

The compute module 100 may include a host central processing unit (CPU) 102 that is configured to execute stored instructions, as well as a memory device 104 that stores instructions that are executable by the host CPU 102. The host CPU 102 may be coupled to the memory device 104 by a bus 106. Additionally, the host CPU 102 can be a single core processor, a multi-core processor, a computing cluster, or any number of other configurations. In some cases, the host CPU 102 and other components of the compute module 100 may be implemented as a system on chip (SOC). Furthermore, the compute module 100 may include more than one host CPU 102. The memory device 104 can include random access memory (RAM), read only memory (ROM), flash memory, or any other suitable memory systems. For example, the memory device 104 may include dynamic random access memory (DRAM).

The compute module is connected to a baseboard 108. The baseboard 108 may contain a central authority 110. The central authority is used to mange each node connected to the baseboard. Additionally, each compute module may also include a plurality of sensors 112. The sensors may collect data regarding its respective node. For example, sensors may collect system management information for each node. The data may include power management data, humidity control data, cooling control data, workload provisioning data, storage servicing data, I/O data, throughput data and the like. The system management data is transmitted to a central authority.

Each compute module also includes logic 114. The logic 114 enables monitoring of system management data for each node. System management data can be passed to the central authority 110 through the logic 114. In some cases, system management data is gathered through several different interfaces. For example, a general purpose input\output (GPIO) interface can be used to enable access to power control, reset, and status information of the compute module 100 from the host CPU 102. A low pin count (LPC) or enhanced serial peripheral interface (eSPI) bus can be used to support various embedded controllers of the compute module 100. Additionally, a platform environment control interface (PECI) can be used to manage thermal sensors within the compute module 100. The logic 114 can obtain system management information from various interfaces and transmit this data to the central authority. Similarly, the central authority can manage the compute module 100 by transmitting information to the logic 114. The logic 114 can then transmit the necessary information to the host CPU 102. In this manner, a standardized set of interfaces can be used to communicate with the host CPU 102.

The block diagram of FIG. 1 is not intended to indicate that the compute module 100 is to include all of the components shown in FIG. 1. Further, the compute module 100 may include any number of additional components not shown in FIG. 1, depending on the details of the specific implementation. Moreover, the compute module 100 may include fewer components than those illustrated in FIG. 1. For example, the compute module 100 may include a GPU, I/O device interface, or display interface.

Figure 2:
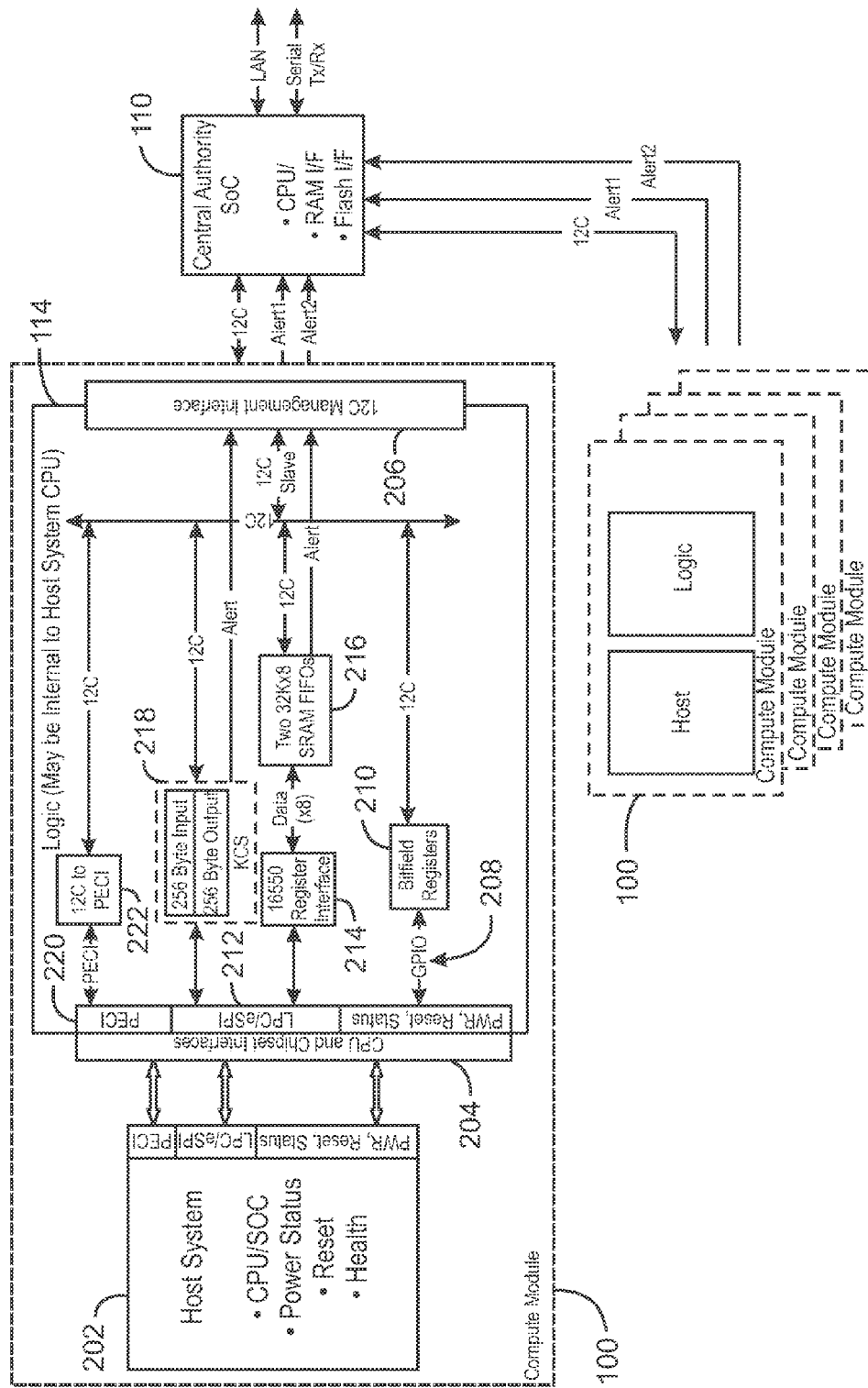
FIG. 2 is an illustration of a system with multiple compute nodes.

FIG. 2 is an illustration of a system 200 with multiple compute nodes. The multi-node system may include a central authority 110 and several nodes or compute modules 100. Even though the system 200 illustrates a finite number of compute modules connected to one central authority, any number of nodes may be directly connected to the central authority. The central authority may be located on a baseboard. Accordingly, the baseboard may have connectors for the central authority and for multiple high density compute modules. The central authority 110 may be a system on chip (SOC), baseboard management controller, or the like. In some cases, the central authority 110 includes a CPU, RAM interface, and a flash interface. As discussed above, the central authority manages all compute modules connected to the baseboard.

To manage the compute modules, the central authority 110 contains firmware that enables a public-facing management interface, usually an intelligent platform management interface (IPMI), data center management interface (DCMI) interface, or web based interface. By locating the firmware within the central authority 110, less up front and ongoing development is required. The interface established by the central authority acts as a proxy for each of the compute modules. An IPMI connection may communicate using a serial connection to a network interface controller (NIC). A DCMI may use connections similar to IPMI, but is typically used in data center management. Accordingly, the central authority may have local area network (LAN) interfaces and serial transmit and receive interfaces.

Each compute module 100 is without a dedicated microcontroller based management solution. Rather, each compute module contains logic 114. The logic 114 may include simple logic, buffers, and state machine hardware to allow monitoring of its respective compute module. The host system 202 may include a CPU or SOC, and sensors that collect data on the power status, reset status, and health of the host system. Data from the host system 202 is transmitted to the logic 114 through a set of CPU and chipset interfaces 204. The logic 114 may consolidate the data in multiple formats from the CPU and chipset interfaces 204 to data that is transmitted on Inter-Integrated Circuit (I2C) buses to an I2C management interface 206. In some cases, the logic 114 consolidates the data from multiple interfaces in multiple formats to an industry standard format and can be transmitted and received using an industry standard interface. Additionally, in some cases, the logic 114 consolidates the data from multiple interfaces in multiple formats to a proprietary standard format and can be transmitted and received using a proprietary interface. Although I2C buses and an I2C management interface 206 are illustrated in FIG. 2, any high speed interface may be used. For example, a Serializer/Deserializer interface (SERDES) may be used.

The logic 114 may be a logic solution to system management. The logic 114 may monitor, for example, CPU temperature, dual in-line memory modules (DIMM) temperature, serial port traffic, and control of GPIO controllers for various functions. The GPIO functionality at reference number 208 can be used to manage functions such as host reset, host power control, host battery status, and the like. Bit field registers 210 may store system management data from the GPIO controllers, and then pass the data from the bit field 210 registers to the I2C management interface 206.

Any technology that connects the logic block 114 to the host CPU 202 may transmit system management data to a register interface 214. For example, a low pin count (LPC) or enhanced serial peripheral interface (eSPI) bus interface 212 may transmit system management data to a register interface 214. The register interface 214 may be a universal asynchronous receiver/transmitter (UART) register. Buffers 216 can then transmit data to the I2C management interface 206. The LPC or eSPI bus interface 212 can also transmit data through a keyboard controller style interface (KCS) 218 to the I2C management interface 206. A PECI interface 220 may transmit data to be converted to I2C at reference number 222. Typically, the data transmitted by the PECI interface 220 is thermal management data, which is then transmitted to the I2C management interface 206. Accordingly, the logic solution 114 may provide host interfaces such as GPIO, KCS, UART, and PECI in order to maximize existing operating system and BIOS compatibility, while minimizing pin count by leveraging existing serial bus standards.

In some cases, the I2C to PECI block at reference number 222 automatically collects sensor data from the host system 202. When the central authority 110 requests system management data, such as thermal data, the data can be provided automatically without accessing the host CPU. In some cases, the I2C to PECI block at reference number 222 updates sensor data from the PECI interface at regular intervals so that the data is readily available. In this manner, the location of data from a PECI interface is abstracted across compute modules. Thus, the system management data is provided without access a data sheet or the host CPU.

In addition to high speed serial interface buses, alerts or interrupts may be present throughout the logic 114. In some cases, the interrupts are used to alert the central authority to a task to be performed. For example, when the logic 114 receives a data or a command from the host system, on the UARTS or serial ports, the logic 114 can assert an interrupt to the central authority. The central authority with then service the compute module that issued the interrupt.

The central authority 110 at the baseboard level is connected to multiple compute module logic solutions via a high speed serial interface or serial management bus. The central authority 110 manages compute nodes through this interface. In embodiments of the invention, the system shown in FIG. 2 can be scaled and extended to support as many compute nodes as desired by one or more of the following embodiments: a) multiple compute nodes on the same serial management bus, b) additional serial management buses, c) increased serial management bus speed is provided, d) increased central authority 110 speed and or memory. Moreover, the central authority can be used to update the logic block. For example, if a bug or other type of error is found in a particular logic block, the central authority can be bug or other type of error.

By removing system management firmware from the compute module, and placing the firmware on the central authority and using logic to convert data from the interfaces to a standard data format, the compute module interface to the central authority can be the same, regardless of the different compute module technologies employed. For example, a compute module may be switched from an LPC to an eSPI from one chipset generation to the next, without this switch impacting the bus used to interface with the logic solution. The logic solution on a per-node basis is more cost effective than a per-node microcontroller based solution, as hardware is not replicated for each node.

Embodiments of the present techniques also enable abstraction of basic node functionality, such as power on, power off, reset, and the like, with less user interaction. Compute node modules are not updated individually, rather, an update of the central authority on a baseboard is performed. Embodiments of the present techniques also work with any sort of interfaces, such as the KCS interface, UARTs, POST code, GPIO, and PECI interfaces. In embodiments of the present techniques, those interfaces are in dedicated silicon, such as a complex programmable logic device (CPLD), field programmable gate array (FPGA), the chipset, or an SOC.

Figure 3:
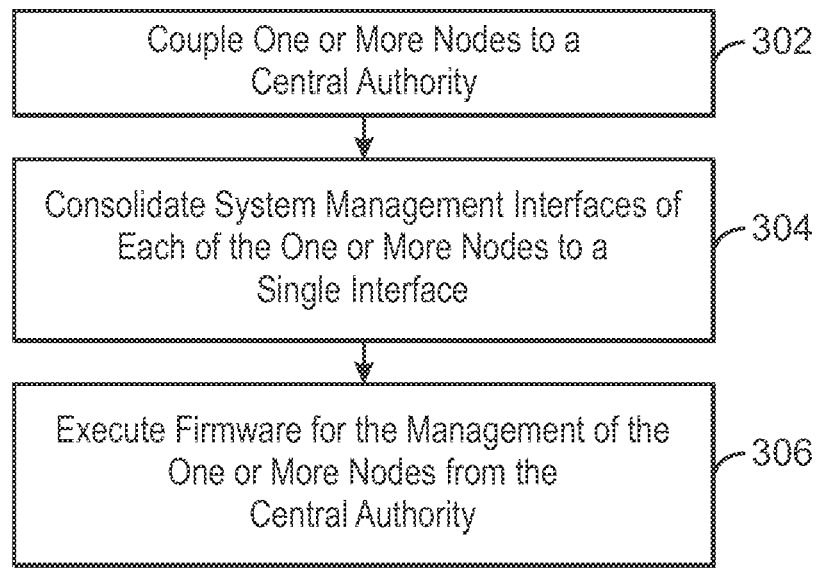
FIG. 3 is a process flow diagram for single microcontroller based management of multiple BMCless compute nodes.

FIG. 3 is a process flow diagram for single microcontroller based management of multiple BMCless compute nodes. At block 302, one or more nodes is coupled to a central authority. At block 304, a plurality of system management interfaces of each of the one more nodes is consolidated to a single interface. At block 306, firmware for the management of the one or more nodes is executed from the central authority.

By using a central authority for management of compute modules, the firmware of each compute modules is not accessed to update the management firmware. Thus, a system may have thousands of compute modules, and up-time is not lost for each node when updating management software.

In some cases, only three lines are used to transmit data between the central authority and the compute modules. This can result in a reduction on the bill of materials for multi-node systems. Further, each multi-node system can be scaled as necessary. Moreover, vendors can use a variety of host CPUs in multi-node systems to interface with the central authority.

EXAMPLE 1

An apparatus for compute module management is described herein. The apparatus includes a host system and a logic solution. The host system includes a central processing unit and a plurality of sensors that collect system management data from multiple interfaces. The logic solution consolidates the system management data to a single format for a single interface and transmits the system management data to a central authority, wherein the central authority includes system management firmware for managing each compute module using the consolidated system management data.

The logic solution may transform system management data to a single format for an industry standard interface. The logic solution may also transform system management data to a single format for a proprietary interface. Additionally, the logic solution may be simple logic, buffer and state machine hardware that enables monitoring of system management data. Further, the single interface may be any high speed interface. The central authority may be a system on chip or baseboard management controller. Moreover, the central authority may include firmware that enables a public-facing interface as a proxy for each of the compute nodes. The public facing management interface may be an Intelligent Platform Management Interface (IPMI) or a Data Center Manageability Interface (DCMI) interface. The single interface may be static, regardless of the multiple interfaces of the host system. The host system functionality may be abstracted by the logic solution. Further, no system management firmware maintained on the host system.

EXAMPLE 2

A system that enables remote compute module management is described herein. The system includes a plurality of connectors and one or more compute modules. One of the plurality of connectors is associated with one of the one or more compute modules, and each of the compute modules includes a logic solution. Additionally, the system includes a central authority, wherein the central authority includes system management firmware to manage each compute module and is coupled with the one or more compute modules via a serial management bus.

The central authority may obtain system management data for each of the one or more compute modules from the logic solution of each of the one or more compute modules. The logic solution may provide host interfaces such as GPIO, KCS, UART, and PECI. The logic solution may also automatically poll a host system for PECI interface data, and the central authority may access the PECI interface data from the compute module through the logic solution. Further, the central authority may receive alerts from the logic solution, and in response to an alert the central authority may service the compute module that issued the alert. The one or more compute modules may be located on a single serial management bus coupled with the central authority. Further, a system including the one or more compute modules may be scaled by providing additional serial management buses.

EXAMPLE 3

A method for node management is described herein. The method includes coupling one or more nodes to a central authority. The method also includes consolidating a plurality of system management interfaces of each of the one more nodes to a single interface, and executing firmware for the management of the one or more nodes from the central authority.

The central authority may be a system on chip (SOC) or a baseboard management controller. A logic solution on each of the one or more nodes may consolidate the system management interfaces of each of the one more nodes to a single interface. Additionally, the single interface may be an industry standard interface. The single interface may also be a proprietary interface. Further, the single interface may be static, regardless of the plurality of system management interfaces.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus for compute module management, comprising:
    a host system, wherein the host system includes a central processing unit and a plurality of sensors that collect system management data from multiple interfaces; and
    a logic solution, wherein the logic solution comprises an inter-integrated circuit (I2C) to a platform environment control interface (PECI) converter that collects the system management data from the host system without accessing the central processing unit of the host system, and wherein the I2C to PECI converter transmits the system management data to a central authority, wherein the central authority includes system management firmware for managing each compute module using the collected system management data.

2. The apparatus of claim 1, wherein the logic solution transforms the system management data to a single format for an industry standard interface.

3. The apparatus of claim 1, wherein the logic solution transforms the system management data to the single format for a proprietary interface.

4. The apparatus of claim 1, wherein the logic solution is simple logic, buffer and state machine hardware that enables monitoring of the system management data.

5. The apparatus of claim 1, wherein the single interface is any high speed interface.

6. The apparatus of claim 1, wherein the central authority is a system on chip or baseboard management controller.

7. The apparatus of claim 1, wherein the central authority includes firmware that enables a public-facing interface as a proxy for each of the compute modules.

8. The apparatus of claim 7, wherein the public facing interface is an Intelligent Platform Management Interface (IPMI) or a Data Center Manageability Interface (DCMI).

9. The apparatus of claim 1, wherein a single interface is static, regardless of the multiple interfaces of the host system.

10. The apparatus of claim 1, wherein host system functionality is abstracted by the logic solution.

11. The apparatus of claim 1, wherein no system management firmware is maintained on the host system.

* * * * *